US009384400B2

(12) United States Patent
Mate et al.

(10) Patent No.: US 9,384,400 B2
(45) Date of Patent: Jul. 5, 2016

(54) METHOD AND APPARATUS FOR IDENTIFYING SALIENT EVENTS BY ANALYZING SALIENT VIDEO SEGMENTS IDENTIFIED BY SENSOR INFORMATION

(71) Applicant: Nokia Technologies Oy, Espoo (FI)

(72) Inventors: Sujeet Shyamsundar Mate, Tampere (FI); Igor Danilo Diego Curcio, Tampere (FI); Francesco Cricri, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/325,827

(22) Filed: Jul. 8, 2014

(65) Prior Publication Data

US 2016/0012293 A1    Jan. 14, 2016

(51) Int. Cl.
| | | |
|---|---|---|
| G06K 9/00 | (2006.01) | |
| G06T 7/00 | (2006.01) | |
| G06F 17/30 | (2006.01) | |
| G11B 27/031 | (2006.01) | |

(52) U.S. Cl.
CPC ...... *G06K 9/00711* (2013.01); *G06F 17/30781* (2013.01); *G06K 9/00744* (2013.01); *G06T 7/004* (2013.01); *G06K 2009/00738* (2013.01); *G06T 2207/10016* (2013.01); *G06T 2207/30221* (2013.01); *G11B 27/031* (2013.01)

(58) Field of Classification Search
CPC combination set(s) only.
See application file for complete search history.

(56) References Cited

U.S. PATENT DOCUMENTS

| | | | |
|---|---|---|---|
| 6,148,149 A | 11/2000 | Kagle | |
| 7,084,753 B1 * | 8/2006 | Maurer | G08B 31/00 340/521 |
| 8,396,249 B1 * | 3/2013 | Khosla | G06K 9/3241 382/103 |
| 8,396,282 B1 * | 3/2013 | Huber | G06K 9/4623 381/56 |

(Continued)

FOREIGN PATENT DOCUMENTS

EP    2 428 903 A1    3/2012

OTHER PUBLICATIONS

Crispim, C. F. et al., *Combining Multiple Sensors for Event recognition of Older People* [online] [retrieved Sep. 11, 2014] [Retrieved from the Internet: http://hal.inria.fr/docs/00/90/70/33/PDF/CrispimEtAl_ACM_MM_MIRTH2013_HAL.pdf>. (dated Nov. 20, 2013) 7 pages.

(Continued)

*Primary Examiner* — Anand Bhatnagar
(74) *Attorney, Agent, or Firm* — Alston & Bird LLP (57) ABSTRACT

A method, apparatus and computer program product are provided to identify one or more salient events from an analysis of one or more images in an efficient and accurate manner. In this regard, the method, apparatus and computer program product may limit the visual analysis of the images to only a subset of the images that are determined to be potentially relevant based upon sensor information provided by one or more sensors carried by the image capturing device. In the context of a method, one or more images that are captured by an image capturing device are identified to be a salient video segment based upon sensor information provided by one or more sensors carried by the image capturing device. The method also includes identifying one or more salient events based upon an analysis of the one or more images of the salient video segment.

20 Claims, 5 Drawing Sheets

(56) References Cited

U.S. PATENT DOCUMENTS

| | | | | |
|---|---|---|---|---|
| 8,711,217 | B2* | 4/2014 | Venetianer | G06F 17/3079 348/143 |
| 2008/0167814 | A1* | 7/2008 | Samarasekera | G01C 21/005 701/469 |
| 2008/0306708 | A1* | 12/2008 | Germain, IV | G01B 21/042 702/153 |
| 2010/0013926 | A1* | 1/2010 | Lipton | G06F 17/3079 348/143 |
| 2010/0026802 | A1* | 2/2010 | Titus | G08B 13/19608 348/143 |
| 2011/0004341 | A1* | 1/2011 | Sarvadevabhatla | B25J 9/1602 700/250 |
| 2011/0090377 | A1 | 4/2011 | Smith | |
| 2012/0206596 | A1* | 8/2012 | Samarasekera | G01C 21/005 348/135 |
| 2013/0176438 | A1 | 7/2013 | Mate et al. | |
| 2014/0161354 | A1 | 6/2014 | Curcio et al. | |

OTHER PUBLICATIONS

Deng, L. Y. et al., *Semantic Analysis and Video Event Mining in Sports Video*, 22$^{nd}$ International Conference on Advanced Information Networking and Applications—Workshops, IEEE Computer Society (2008), pp. 1517-1522

Hanjalic, A., *Generic approach to highlight extraction from a sport video*, IEEE International Conference on Image Processing (2003) 4 pages.

Huang, C-L. et al., *Shot and Scoring Events Identification of Basketball Videos*, ICME (2006) pp.1885-1888.

Liu, Y. et al., *A New Method for Shot Identification in Basketball Video*, Journal of Software, vol. 6, No. 8 (Aug. 2011),pp. 1468-1475.

Shih, H-C et al., *Semantic Understanding and Shot Event Analysis for Basketball Video*, The 18$^{th}$ IPRP Conference on Computer Vision, Graphics and Image Processing (2005) 8 pages.

Song, Y. et al., *Unified sports video highlight detection based on multi-feature fusion*, International Conference on Multimedia and Ubiquitous Engineering, IEEE Computer Society (2009) pp. 83-87.

Zhang, Y. et al., *Semantic Event Extraction From Basketball Games Using Multi-Model Analysis*, ICME (2007), pp. 2190-2193.

European Search Report for Application No. EP 15 17 2253 dated Nov. 23, 2015.

Abdollahian, G. et al., *Camera Motion-Based Analysis of User Generated Video*, IEEE Transactions on Multimedia, IEEE Service Center, vol. 12, No. 1 (Jan. 2010) 28-41.

Francesco, C. et al., *Multimodal Extraction of Events and of Information About the Recording Activity in User Generated Videos*, Multimedia Tools and Applications, vol. 70, No. 1 (May 2014) 119-158.

Francesco, C. et al., *Multimodal Event Detection in User Generated Videos*, Multimedia (ISM), 2011 IEEE International Symposium on, IEEE (Dec. 5, 2011) 263-270.

Francesco, C. et al., *Salient Event Detection in Basketball Mobile Videos*, 2014 IEEE International Symposium on Multimedia (Dec. 10, 2014) 63-70.

* cited by examiner

METHOD AND APPARATUS FOR IDENTIFYING SALIENT EVENTS BY ANALYZING SALIENT VIDEO SEGMENTS IDENTIFIED BY SENSOR INFORMATION

TECHNOLOGICAL FIELD

An example embodiment relates generally to the analysis of images so as to identify one or more salient events and, more particularly, to the identification of one or more salient events from a salient video segment that is identified based upon sensor information.

BACKGROUND

A number of applications would benefit from the automatic analysis of video images, such as the analysis of video images for the purpose of understanding the semantics present in the video content. For example, automated video analysis may support video search services, the automatic organization of personal media collections, the automatic summarization of individual videos, human-computer visual interaction and the like. The demand for automated analysis of video images has increased in recent years as the quantity of video images has correspondingly increased due to, for example, the proliferation of mobile terminals, such as smartphones, that carry or otherwise include relatively high-quality cameras that permit the recording of video images at most any time. Indeed, as a result of the proliferation of mobile terminals that include cameras, another example of an application that would benefit from the automated analysis of video images is the generation of a multi-camera edited video in which the video images of the same scene that have been recorded by multiple cameras, such as by the cameras carried by a plurality of spectators at a concert or sporting event, may be automatically combined once the video images captured by the different cameras are analyzed and reconciled with one another.

Video images include a variety of different types of semantics. For example, video images include semantics that define the video genre (e.g., sports, travel, music, etc.), the presence of a specific object, the presence of a specific face, the location at which the video recording was performed, the scene type (e.g., outdoor versus indoor, cityscape versus landscape, etc.) Another type of semantic that may be present within a video recording is a salient event, such as a specific human action, e.g., running, drinking, falling down, etc.

The detection of salient events in an automated fashion may be useful to support various applications or services, such as an application that reviews video images and detects instances in which a person has fallen. Additionally, the automated detection of salient events would permit summaries of a video, such as summaries of a video of a sporting event, to be generated. For example, the video images captured by a plurality of cameras of the same scene, such as a concert or a sporting event, could be automatically reviewed to detect the salient events, thereby permitting a summary of the video images captured by the plurality of cameras to be constructed. The resulting summaries could include the video images of the salient events with other less important portions of the original video images having been omitted.

However, the automated detection of salient events within a video presents a number of challenges. For example, the detection of salient events generally has a relatively high computational complexity as a result of the visual analysis that is required. The computational complexity is particularly substantial in instances in which the video images recorded by a plurality of cameras of the same event are to be analyzed due to the sizeable amount of content that is to be analyzed. The computational complexity associated with the automated detection of salient events not only increases the time required for salient event detection, but may also limit the hardware platforms that may perform the image analysis. In this regard, the automated detection of salient events within video images may be particularly challenging in instances in which the visual analysis is to be performed by a mobile terminal as a result of their increasing, but still limited computational resources.

BRIEF SUMMARY

A method, apparatus and computer program product are provided in accordance with an example embodiment in order to identify one or more salient events from an analysis of one or more images in an efficient and accurate manner. In this regard, the method, apparatus and computer program product of an example embodiment may limit the visual analysis of the images to only a subset of the images that are determined to be potentially relevant based upon sensor information provided by one or more sensors carried by the image capturing device. As such, the method, apparatus and computer program product of an example embodiment may more efficiently identify salient events by reducing the computational resources required to visually analyze a smaller number or a smaller percentage of the images that are captured. Additionally, by limiting the visual analysis to one or more images that are determined to be potentially relevant based upon sensor information, the method, apparatus and computer program product of an example embodiment may reduce the likelihood of a false positive, that is, may reduce the likelihood of falsely identifying an image to represent a salient event, thereby increasing the accuracy with which the salient events are identified.

In an example embodiment, a method is provided that includes identifying one or more images captured by an image capturing device to be a salient video segment based upon sensor information provided by one or more sensors carried by the image capturing device. The method of this example embodiment also includes identifying one or more salient events based upon an analysis of the one or more images of the salient video segment.

The method may also include receiving an indication of a salient orientation, such as by receiving user input indicative of the salient orientation. The method of this example embodiment may also include determining an orientation of the image capturing device based upon the sensor information. As such, the method of this example embodiment may identify one or more images to be a salient video segment based upon the relationship of the orientation of the image capturing device to the salient orientation. For example, the method may identify one or more images to be the salient video segment based upon satisfaction of a predefined angular distance threshold between the salient orientation and the orientation of the image capturing device.

The method of an example embodiment may also include analyzing the one or more images of the salient video segment to identify the one or more images that include a salient object. In this regard, the one or more images that include the salient object may form a spatio-temporal region of interest. The method of this example embodiment may then identify one or more salient events based upon an analysis of the one or more images of the spatio-temporal region of interest. The method of this example embodiment may also include receiving an indication of a salient object prior to defining the spatio-temporal region of interest and, in an instance in which the processor is without a detection algorithm for the salient object, causing another computing device to be notified and receiving the detection algorithm for the salient object from the another computing device. The method of an example embodiment may also include determining, upon capture of a plurality of images by the image capturing device, whether an image of a salient video segment captured by the image capturing device includes the salient object. In an instance in which the salient object is not in the image, the method of this example embodiment may also analyze one or more images subsequently captured by the image capturing device to identify the salient object and redefine the salient orientation as the orientation of the image capturing device when the salient objection was captured.

In another example embodiment, an apparatus is provided that includes at least one processor and at least one memory including computer program code with the at least one memory and the computer program code configured to, with the processor, cause the apparatus to at least identify one or more images captured by an image capturing device to be a salient video segment based upon sensor information provided by one or more sensors carried by the image capturing device. The at least one memory and computer program code may also be configured to, with the processor, cause the apparatus of this example embodiment to identify one or more salient events based upon an analysis of the one or more images of the salient video segment.

The at least one memory and the computer program code may be further configured to, with the processor, cause the apparatus of an example embodiment to receive an indication of a salient orientation, such as by receiving user input indicative of the salient orientation. The at least one memory and the computer program code may be further configured to, with the processor, cause the apparatus of this example embodiment to determine an orientation of the image capturing device based upon the sensor information. As such, the at least one memory and computer program code may be configured to, with the processor, cause the apparatus of this example embodiment to identify one or more images to be a salient video segment based upon a relationship of the orientation of the image capturing device to the salient orientation. The at least one memory and the computer program code may also be configured to, with the processor, cause the apparatus of this example embodiment to identify one or more images to be the salient video segment based upon satisfaction of a predefined angular distance threshold between the salient orientation and the orientation of the image capturing device.

The at least one memory and the computer program code may be further configured to, with the processor, cause the apparatus of an example embodiment to analyze the one or more images of the salient video segment to identify the one or more images that include a salient object. The one or more images that include the salient object may define the spatio-temporal region of interest. In this example embodiment, the identification of one or more salient events may be based upon an analysis of the one or more images of the spatio-temporal region of interest. The at least one memory and the computer program code may be further configured to, with the processor, cause the apparatus of this example embodiment to receive an indication of the salient object prior to defining the spatio-temporal region of interest and, in an instance in which the apparatus is without a detection algorithm for the salient object, cause another computing device to be notified and receive the detection algorithm for the salient object from the another computing device. The at least one memory and the computer program code may be further configured to, with the processor, cause the apparatus of an example embodiment to determine, following the capture of a plurality of images by the image capturing device, whether an image captured by the image capturing device includes the salient object. In an instance in which the salient object is not in the image, the at least one memory and the computer program code may be further configured to, with the processor, cause the apparatus of this example embodiment to analyze one or more images subsequently captured by the image capturing device to identify the salient object and to redefine the salient orientation as the orientation of the image capturing device when the image that includes the salient object was captured.

In another example embodiment, a computer program product is provided that includes at least one non-transitory computer-readable storage medium having computer-executable program code portions stored therein with the computer-executable program code portions including program code instructions for identifying one or more images captured by an image capturing device to be a salient video segment based upon sensor information provided by one or more sensors carried by the image capturing device. The computer-executable program code portions also include program code instructions for identifying one or more salient events based upon an analysis of the one or more images of the salient video segment.

The computer-executable program code portions of an example embodiment may also include program code instructions for receiving an indication of a salient orientation, such as by receiving user input indicative of a salient orientation. The computer-executable program code portions of this example embodiment may also include program code instructions for determining an orientation of the image capturing device based upon the sensor information. In this example embodiment, the identification of one or more images to be a salient video segment may be based upon a relationship of the orientation of the image capturing device to the salient orientation. In this example embodiment, the program code instructions for identifying one or more images to be the salient video segment may include program code instructions for identifying one or more images to be the salient video segment based upon satisfaction of a predefined angular distance threshold between the salient orientation and the orientation of the image capturing device.

The computer-executable program code portions of an example embodiment may also include program code instructions for analyzing the one or more images of the salient video segment to identify the one or more images that include the salient object. The one or more images that include the salient object may form a spatio-temporal region of interest. In this example embodiment, the identification of the one or more salient events may be based upon an analysis of the one or more images of the spatio-temporal region of interest. The computer-executable program code portions may also include, in accordance with an example embodiment, program code instructions for determining, following capture of a plurality of images by the image capturing device, whether an image captured by the image capturing device includes the salient object. In an instance in which the salient object is not in the image, the computer-executable program code portions of this example embodiment may also include program code instructions for analyzing one or more images subsequently captured by the image capturing device to identify the salient object and redefining the salient orientation as the orientation of the image capturing device when the image that includes the salient object was captured.

In yet another example embodiment, an apparatus is provided that includes means for identifying one or more images captured by an image capturing device to be a salient video segment based upon sensor information provided by one or more sensors carried by the image capturing device. The apparatus of this example embodiment may also means for identifying one or more salient events based upon an analysis of the one or more images of the salient video segment.

BRIEF DESCRIPTION OF THE DRAWINGS

Having thus described certain example embodiments of the present disclosure in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

A method, apparatus and computer program product are provided in accordance with an example embodiment of the present invention in order to identify one or more salient events from the images captured by an image capturing device. The method, apparatus and computer program product of an example embodiment provide for the identification of the one or more salient events in an efficient and accurate manner with less computational complexity by focusing its analysis upon only certain images captured with the image capturing device at a particular orientation or range of orientations at which the identification of a salient event is more likely. As such, the salient events may be identified more quickly and/or in a manner that consumes fewer computational resources. Thus, although the apparatus may be embodied by any of a wide variety of computing devices, the apparatus of an example embodiment may be embodied by a mobile terminal, such as a smartphone, or other computing device having limited computational resources since the identification of one or more salient events from the images captured by an image capturing device may demand fewer resources. Further, the method, apparatus and computer program product of an example embodiment may permit one or more salient events to be identified from one or more images captured by an image capturing device in a manner that is more accurate by reducing the number or percent of false positives in which a salient event is identified when, in fact, the salient event is not present.

As noted above, the apparatus of an example embodiment may be embodied by any of a wide variety of computing devices. For example, the apparatus may be embodied by a mobile terminal, such as a mobile telephone, a smartphone, a personal digital assistant (PDA), a tablet computer, a laptop computer or the like, that includes or is otherwise associated with an image capturing device, such as a camera including, for example a video recorder. Alternatively, the apparatus may be embodied by a fixed computing device, such as a personal computer, a computer workstation, a server or the like, that receives images recorded by an image capturing device. Still further, the apparatus may be embodied by two or more computing devices that are in communication or are otherwise networked together and configured to collaborate to perform the operations described below in regards to example embodiments of the present invention.

Figure 1:
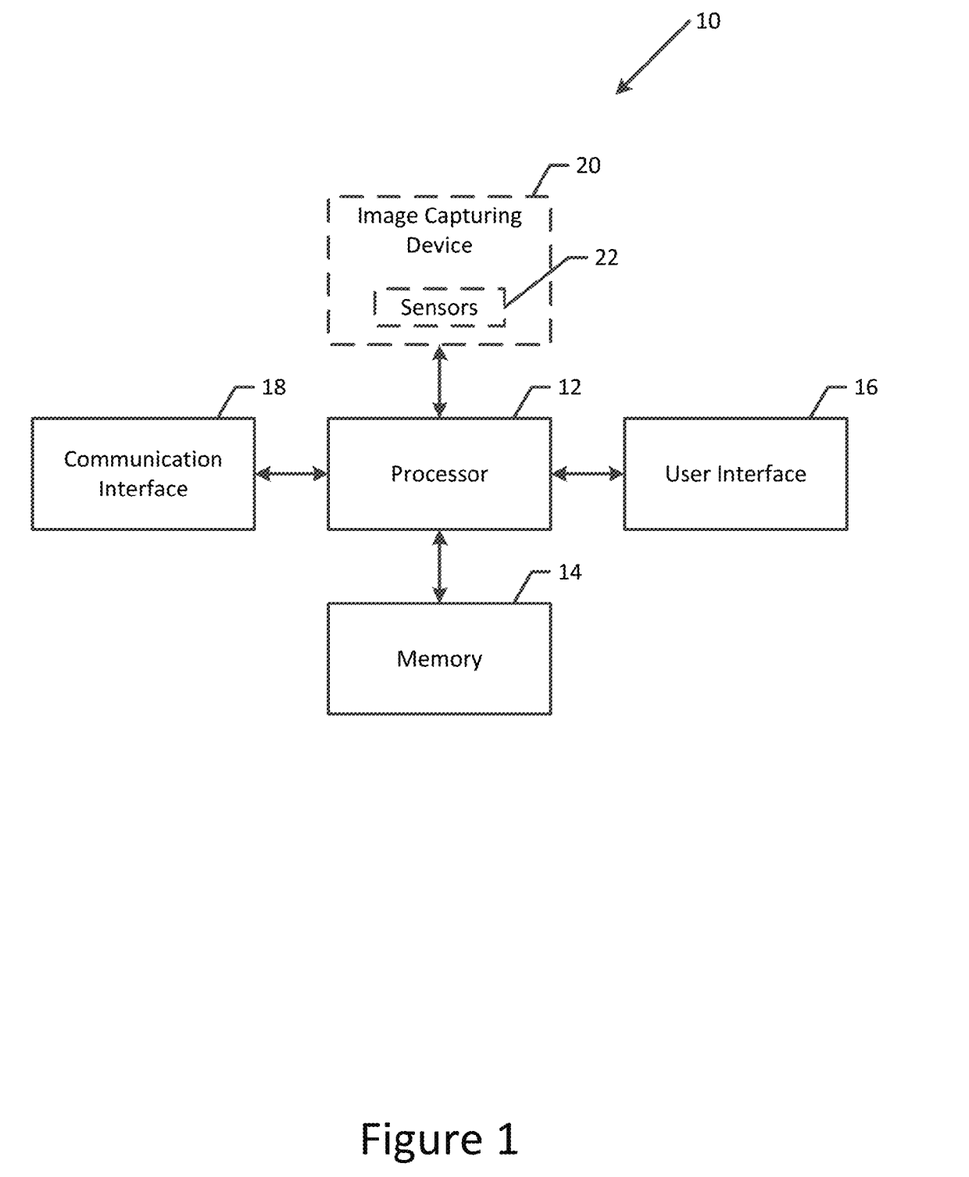
FIG. 1 is a block diagram of an apparatus that may be specifically configured in accordance with an example embodiment of the present invention.

Regardless of the type of computing device that embodies the apparatus, the apparatus 10 of one example embodiment is depicted in FIG. 1. The apparatus may include, be associated with or otherwise in communication with a processor 12, a memory device 14, a user interface 16 and a communication interface 18. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 10 may be embodied by a computing device. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 10 of an example embodiment may also include or otherwise be in communication with a user interface 16. The user interface may include a touch screen display, a keyboard, a mouse, a joystick or other input/output mechanisms. In some embodiments, the user interface, such as a display, speakers, or the like, may also be configured to provide output to the user. In this example embodiment, the processor 12 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 14, and/or the like).

The apparatus 10 of the illustrated embodiment may also include a communication interface 18 that may be any means such as a device or circuitry embodied in either hardware or a combination of hardware and software that is configured to receive and/or transmit data from/to a server and an image capturing devices 20 in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication.

The apparatus 10 may optionally include an image capturing device 20 for capturing one or more images. The image capturing device may be any of a wide variety of different types of image capturing devices. For example, the image capturing device may include a camera or an electronic device that incorporates a camera that captures video images. In this regard, the image capturing device may include a video recorder or a professional video camera. Alternatively, the apparatus may be distinct from the image capturing device, but may be configured to receive the images captured by the image capturing device, such as from the image capturing device, from a memory device in which the images have been stored or from another computing device, such as a server.

Figure 2:
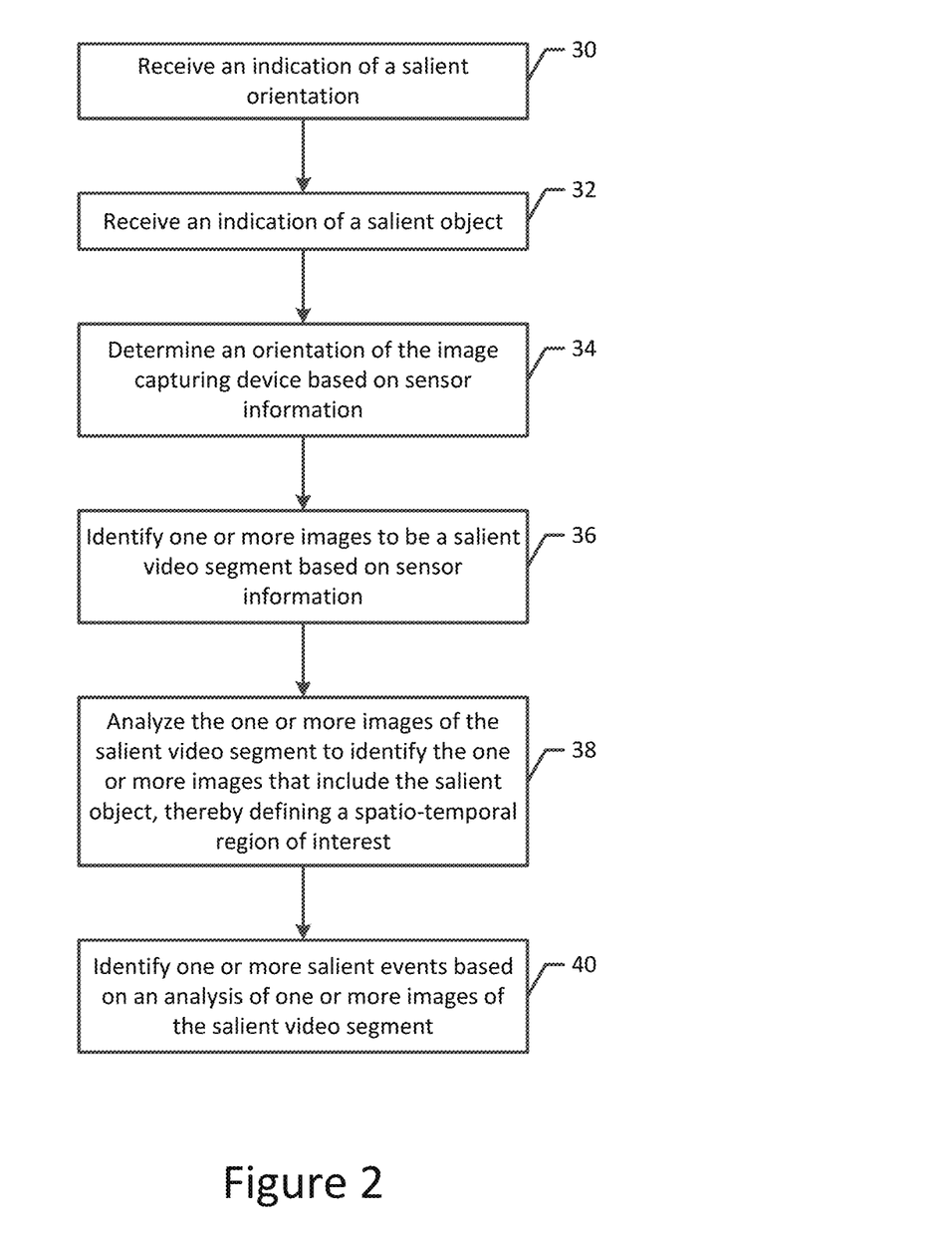
FIG. 2 is a flowchart illustrating operations performed, such as by the apparatus of FIG. 1, in accordance with an example embodiment of the present invention.

The operations performed in order to identify one or more salient events from the images captured by an image capturing device 20 in accordance with an example embodiment of the present invention are depicted in FIG. 2. As shown in block 30 of FIG. 2, the apparatus 10 may include means, such as the processor 12, the user interface 16 or the like, for receiving an indication of a salient orientation. The salient orientation is the orientation of the image capturing device at which a salient object is within the image captured by the image capturing device. The salient object is an object that is associated with a salient event that is to be identified. In this regard, while a salient object may appear in images that do not capture a salient event, the salient event, when it does occur, will occur in the proximity of the salient object. As such, an image that includes a salient object has an increased probability to have also captured a salient event.

Various salient objects may be identified depending upon the subject of the images and the salient event to be identified. In the context of a sporting event having goals positioned at opposite ends of the field or court and in which the salient event is the scoring of a goal by either of the teams, the goals may be the salient objects as any scoring will be accomplished in conjunction with the goals. Alternatively, in an instance in which images of a concert or play are captured by an image capturing device and in which the salient event is the appearance of a particular performer on stage, the salient object will be the face of the particular performer.

Various indications of salient orientation may be received. For example, the apparatus 10 may include means, such as the processor 12, the user interface 16 or the like, for receiving user input indicative of the salient orientation. By way of example, the image capturing device 20 may be oriented such that the image captured by the image capturing device includes the salient object. In this configuration, the user may provide user input that indicates that the salient object is within the image captured by the image capturing device. In response to the user input, sensor information may be obtained that defines the orientation of the image capturing device. In this regard, the image capturing device may include one or more sensors 22 configured to provide sensor information relating to the orientation of the image capturing device. While the image capturing device may include a wide variety of sensors, the image capturing device of an example embodiment may include a gyroscope for determining the orientation about each of three mutually perpendicular axes as well as the speed along each axis, an accelerometer for determining the acceleration along a respective axis, a magnetometer for determining rotation about a horizontal axis or the like.

Figure 3:
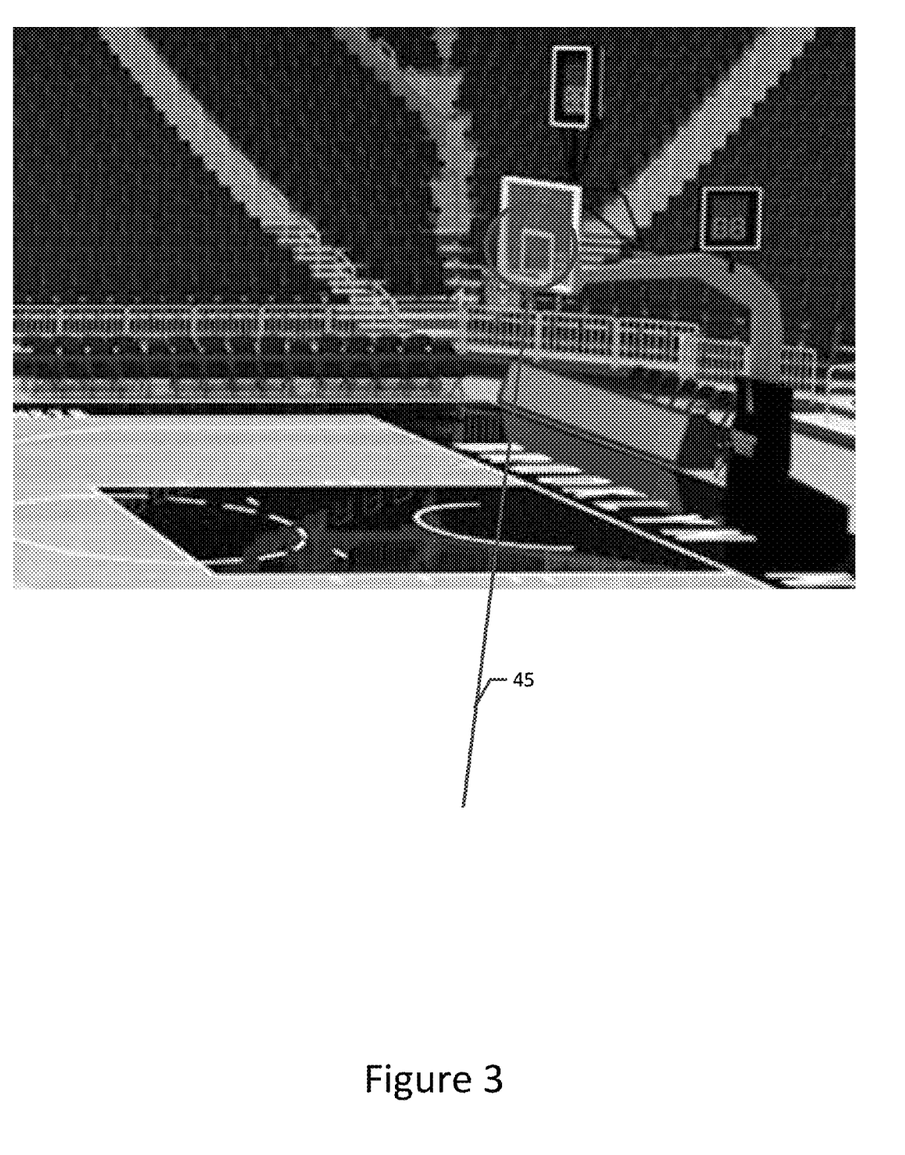
FIG. 3 is an image that depicts the receipt of user input indicative of the salient orientation, in accordance with an example embodiment of the present invention.

By way of example, FIG. 3 depicts an image captured by an image capturing device 20. As the salient event to be subsequently identified relates to scoring in which a basketball passes through the goal, the goal is the salient object since the goal will always be present when a salient event occurs. In an instance in which the image capturing device is positioned in the salient orientation, the salient object, that is, the goal, is within the image that is captured. In an example embodiment shown in FIG. 3, user input, such as a tap 45 by the user upon the touch screen of the user interface 16, may be provided when the image capturing device is positioned in the salient orientation with the salient object within the image captured by the image capturing device. In the example embodiment of FIG. 3, the user input not only generally indicates that the image capturing device has the salient orientation, but the user input may also designate the salient object, such as by touching upon the basketball goal that is displayed on the touch screen. In other embodiments, the user input need not designate the salient object, but the salient object may, instead, be predefined or may be automatically detected by image analysis of the image captured by the image capturing device while in the salient orientation.

Although the salient orientation may be defined by user input, other indications of the salient orientation may be received in other embodiments. For example, the salient orientation may be predefined based upon a known relationship between the position of the salient object and the location of the image capturing device 20, such as a predefined seating location of the user. Alternatively, images of the user may be captured, such as by the image capturing device, and analyzed to determine the gaze of the user. The salient orientation may then be determined in accordance with this example embodiment to coincide with the direction in which the user gazes most frequently.

The apparatus 10 may include means, such as the processor 12, the user interface 16 or the like, for receiving an indication of the salient object. See block 32 of FIG. 2. As described above, the indication of the salient object may be provided by user input, such as by tapping the depiction of the salient object upon a touch screen. Alternatively, the salient object may, instead, be predefined and may be automatically detected by image analysis of the image captured by the image capturing device while in the salient orientation.

Figure 4:
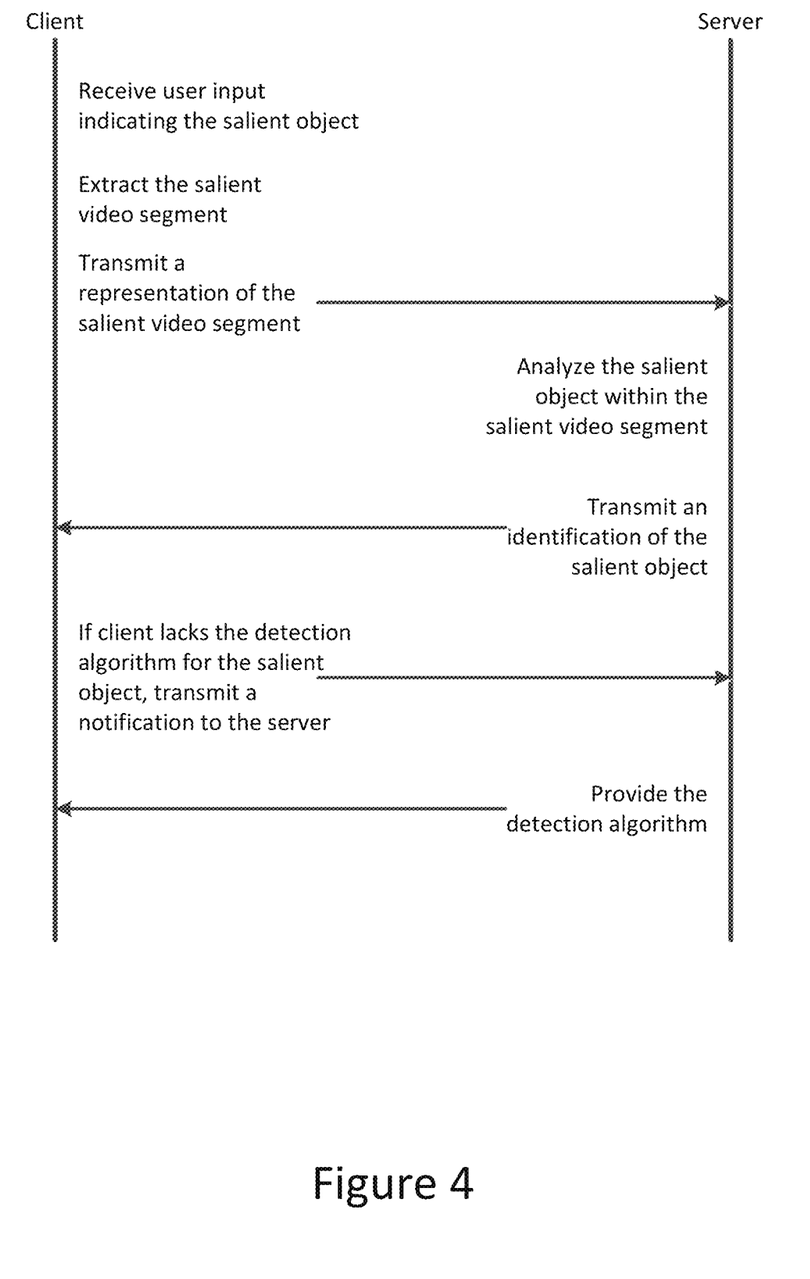
FIG. 4 is a signaling diagram depicting signals exchanged between a client, such as may embody or be associated with the apparatus of FIG. 1, and a server in order to facilitate the identification of a salient object within one or more images in accordance with an example embodiment of the present invention.

While the salient object may be directly identified by the user input, the user input may alternatively define a region of the image that contains the salient object, but may not specifically identify the salient object. In this embodiment, the region identified by the user input may be analyzed, such as by image recognition, to identify the salient object within the region. Although the apparatus 10, such as the processor 12, may be configured to analyze the region of the image so as to identify the salient object, the apparatus of an example embodiment may cause the image to be provided to another computing device, such as a server, in order to permit the other computing device to identify the salient object within the region, as shown in FIG. 4. After the other computing device, such as the server, identifies the salient object, such as by image recognition, the computing device may provide an identification of the salient object to the apparatus.

As shown in block 34 of FIG. 2, the apparatus 10 may also include means, such as the processor 12 or the like, for determining the orientation of the image capturing device 20 based upon the sensor information provided by the image capturing device. In this regard, the processor may receive the sensor information and may determine the orientation of the image capturing device based thereupon. Alternatively, such as in an instance in which the image capturing device is separate from the apparatus, the image capturing device may determine its orientation based upon the sensor information and then provide information regarding the orientation to the apparatus. The orientation of the image capturing device may be determined repeatedly and, in one embodiment, may be determined in conjunction with, that is, at the time of, the capture of each image.

As shown in block 36 of FIG. 2, the apparatus 10 may also include means, such as the processor 12 or the like, for identifying one or more images captured by the image capturing device 20 to be a salient video segment based upon the sensor information provided by the sensor(s) 22 of the image capturing device. In an example embodiment, one or more images may be identified to be a salient video segment based upon a relationship of the orientation of the image capturing device, such as at the time at which the respective images were captured, to the salient orientation. By way of example, a predefined angular distance threshold may be established which defines the window or range about the salient orientation in which the images will be considered to comprise the salient video segment. The predefined angular distance threshold may be dependent upon various parameters including, for example, the field of view and the zoom level. For example, an image capturing device with a lower zoom-in level may dictate a smaller, i.e., narrower, predefined angular distance threshold. In this example embodiment, the processor may identify one or more images to comprise the salient video segment based upon satisfaction of the predefined angular distance threshold between the salient orientation and the orientation of the image capturing device at the time at which the respective image(s) was captured.

Thus, in an example embodiment in which the predefined angular distance threshold is 5°, any image captured by the image capturing device 20 while the orientation of the image capturing device is within 5° of the salient orientation, e.g., salient orientation +/−5°, will be included within the salient video segment. By establishing the predefined angular distance threshold, the images captured by the image capturing device 20 that include the salient object and, as a result, likely capture the salient event, will be included within the salient video segment. Conversely, those images that are captured by the image capturing device that are more greatly offset from the salient orientation by more than the predefined angular distance threshold and which are therefore less likely to include the salient object and, as a result, less likely to capture the salient event, are not included within the salient video segment. Thus, the subsequent review of the salient video segment to identify the salient event(s) may be more efficient while still ensuring that the likelihood that the salient events will be identified remains high.

In an instance in which the orientation of the image capturing device 20 satisfies the predefined angular distance threshold relative to the salient orientation, a plurality of images may be captured, such as while a basketball team prepares to shoot and then follows through with the shot at the goal. Since each of the images is captured while the predefined angular distance threshold is satisfied, the salient video segment may include a plurality of temporally proximate images. As such, the salient video segment may form a temporal region of interest.

By way of example in which two salient orientations representative of the two basketball goals at opposite ends of a basketball court are identified, the apparatus 10, such as the processor 12, may be configured to identify the images to be included within a salient video segment as described below. In this example, the apparatus, such as the processor, may determine a frame at time t to be considered to belong to a temporal region of interest if the angular distance between the orientation α(t) of the image capturing device 20 and one of the two salient orientations (indicated as $\alpha_{side}^{salient}$, where side can be either left or right) satisfies the following equation:

$$\alpha(t) - \alpha_{side}^{salient} \leq \frac{\alpha_{side}^{salient} - \alpha_{center}}{K},$$

where $\alpha_{side}^{salient} = \alpha_{left}^{salient}$ if $\alpha(t) \in \alpha_{left}^{section}$, or $\alpha_{side}^{salient} = \alpha_{right}^{salient}$ if $\alpha(t) \in \alpha_{right}^{section}$ and K is a predetermined parameter. The subtraction operation in the foregoing operation should also take into account the wrap around zero degrees. $\alpha_{left}^{section}$ and $\alpha_{right}^{section}$ are the ranges of angular orientations defining the left and right angular sections of the field with respect to the camera. These ranges of angular orientations may be derived from the two boundaries $\alpha_{left}^{boundary}$ and $\alpha_{right}^{boundary}$ the range of all horizontal orientations that the image capturing device had during the video recording. $\alpha_{left}^{boundary}$ and $\alpha_{right}^{boundary}$ may be determined by computing the histogram of image capturing device orientation occurrences, filtering out outlier orientations (e.g., orientations with few occurrences), and determining the boundaries of the widest angular range between two orientations with non-zero occurrences. After identifying the two boundaries, the central pointing orientation $\alpha_{center}$ may be computed as the circular mean between $\alpha_{left}^{boundary}$ and $\alpha_{right}^{boundary}$ as follows:

$$\alpha_{center} = \arctan 2 \left( \frac{1}{2}(\sin(\alpha_{left}^{boundary}) + \sin(\alpha_{right}^{boundary})), \frac{1}{2}(\cos(\alpha_{left}^{boundary}) + \cos(\alpha_{right}^{boundary})) \right)$$

The two angular sections $\alpha_{left}^{section}$ and $\alpha_{right}^{section}$ are then identified as the angular ranges of orientations spanning from $\alpha_{center}$ to $\alpha_{left}^{boundary}$ and from $\alpha_{center}$ to $\alpha_{right}^{boundary}$.

In an example embodiment, the apparatus 10 may also include means, such as the processor 12 or the like, for analyzing the one or more images of a salient video segment to identify the one or more images within the salient video segment that include the salient object. See block 38 of FIG. 2. Although the images of the salient video segment are captured with the image capturing device 20 in an orientation approximating the salient orientation, the salient object need not necessarily be included in each image as a result of, for example, the zoom and/or tilt of the image capturing device. The apparatus may be configured to recognize the salient object by image recognition. Alternatively, the apparatus may be configured to cause the one or more images of the salient video segment to be provided to another computing device, such as a server, that is configured to perform image recognition upon the images and to identify the images of the salient video segment that include the salient object. In this regard, a representation of the salient video segment may be transmitted to another computing device for image recognition. For example, the representation of the salient video segment may include the salient video segment or a lower resolution segment, a set of still images or some other transformed version of the salient video segment, e.g., a representation of the salient video segment in monochrome or some other color-space or after having been subjected to some other post-processing, that is transmitted to reduce the transmission bandwidth. In this example embodiment, the other computing device, such as the server, may then notify the apparatus of the one or more images of the salient video segment that include the salient object.

In an example embodiment, the salient object may be identified utilizing a detection algorithm, such as may be implemented by computer program instructions executed by the processor 12, associated with the respective salient object that reviews an image and identifies the salient object therein. For example, in an instance in which the salient object is a basketball goal, the apparatus 10, such as the processor, the memory 14 or the like, may include a predefined definition of the basketball hoop that is utilized by the detection algorithm during image recognition in order to identify the image(s) of the salient video segment that includes the salient object. In an embodiment in which the apparatus 10, such as the processor, is configured to analyze the image(s) to identify the salient object, but does not include a detection algorithm associated with the respective salient object, the apparatus may notify another computing device, such as a server, of the salient object. The notification may include and/or identify either a region containing the object or features extracted from that region. As shown in FIG. 4, a representation of the salient video segment may be transmitted to the other computing device. For example, the representation of the salient video segment may include the salient video segment or a lower resolution segment, a set of still images or some other transformed version of the salient video segment, e.g., a representation of the salient video segment in monochrome or some other color-space or after having been subjected to some other post-processing, that is transmitted to reduce the transmission bandwidth. The other computing device, such as the server, may include a library of detection algorithms for various salient objects. As shown in FIG. 4, the apparatus may thereafter receive the detection algorithm associated with the respective salient object such that the apparatus, such as the processor, can thereafter analyze the image(s) to identify the salient object.

Regardless of the manner in which the images of a salient video segment are analyzed to identify the image(s) that include the salient object, the spatial region(s) of the image(s)

of the salient video segment that includes the salient object are considered to form a spatio-temporal region of interest. See block 38 of FIG. 2. It is also noted that only the images of a salient video segment are analyzed to identify the salient object as only the images of a salient video segment could have captured a salient event. As such, all of the other images that are captured by the image capturing device 20 that are not included within a salient video segment need not be analyzed in the same manner such that the image analysis is more efficient and requires fewer computational resources than other techniques that analyze greater numbers of the images.

As shown on block 40 of FIG. 2, the apparatus 10 may also include means, such as the processor 12 or the like, for identifying one or more salient events based upon an analysis of the one or more images of the salient video segment. The image analysis that is performed in order to identify one or more salient events may be further refined in that the apparatus of an example embodiment may include means, such as the processor or the like, for identifying one or more salient events based upon an analysis of the one or more images of the spatio-temporal region of interest, that is, by an analysis of those images that were captured by the image capturing device 20 having an orientation that approximates the salient orientation so as to be within a salient video segment and that also includes the salient object so as to be within a spatio-temporal region of interest. As such, the apparatus, such as the processor, of an example embodiment need only analyze the images of the spatio-temporal regions of interest and need not analyze the other images captured by the image capturing device in order to identify the salient events, thereby further improving the efficiency and reducing the computational complexity required to identify the salient events. Moreover, by limiting the images that are analyzed for purposes of identifying the salient events, the accuracy with which salient events are identified may be increased by reducing instances of false positives since a number of images that do not include the salient events are not analyzed and, as a result, cannot be falsely identified to include a salient event.

Once the one or more salient events have been identified, the apparatus 10, such as the processor 12, may perform further functions, including creation of a summary consisting of a compilation of the images representative of the salient events captured by one or a plurality of image capturing devices 20. For example, in an instance in which the event that is being recorded by the image capturing device is a basketball game and the salient object is a basketball goal, the salient events may include those instances in which either of the teams score as represented by the ball passing through the basketball goal. As such, the salient video segments may include those images captured by the image capturing device while the image capturing device has an orientation that approximates the salient orientation in which the image capturing device is pointed toward one of the two basketball goals. Based upon an analysis of the images of the salient video segments to identify those images that actually include the basketball goal, spatio-temporal regions of interest are defined that are, in turn, analyzed to identify those images that do not simply include an image of the basketball goal, but that depict the ball passing through the basketball goal. The images of the ball passing through the basketball goal, as well as one or more images that precede and/or follow the images of the basketball passing through the basketball goal in some instances, may be identified as the images representative of the salient events. As such, the images representative of the baskets scored during a basketball game may be readily identified without individually analyzing each of the images captured by the image capturing device. A summary of the instances in which one or both teams scored during the basketball game may then be readily compiled.

In the example in which the salient event is a ball passing through a goal, in order to avoid false positives and to accordingly improve the accuracy of the salient event detection, the apparatus 10, such as the processor 12, may be configured to identify a salient event in an instance in which the ball is detected along with the spatial object, i.e., the goal, in a predefined number of consecutive images and in similar spatial positions (as adapted proportionally to the movement of the image capturing device 20 as indicated by the sensors 22). Moreover, in order to cope with false negatives in which the salient object appears in an image but is not detected, the apparatus, such as the processor, may be configured to permit a predefined, maximum number of images in which, in this example embodiment, the ball is not detected. In this regard, the apparatus, such as the processor, also copes with false negatives by identifying images to be included in a salient video segment based on the orientation of the image capturing device and not whether the image is determined to include the salient object.

Figure 5:
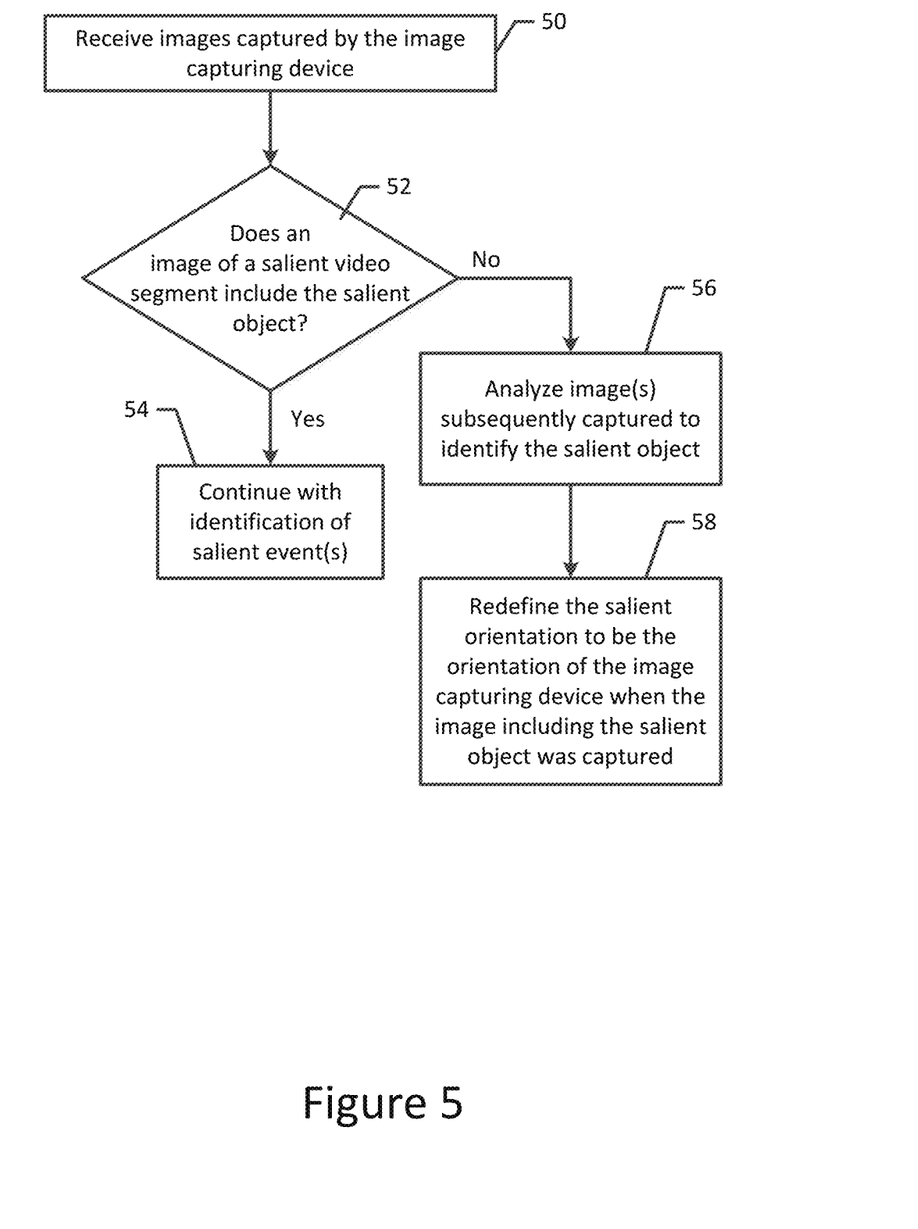
FIG. 5 is a flowchart illustrating operations performed, such as by the apparatus of FIG. 1, in order to redefine the salient orientation, such as in an instance in which the image capturing device has moved, in accordance with an example embodiment of the present invention.

During the event that is recorded by the image capturing device 20, the user who is making the video recording may move, such as from one seat in the arena to another, from one side of the court or field to the other, or the like. In order to ensure that the salient orientation that defines the images to be included within the salient video segments that, in turn, are subjected to further image analysis remain relevant by capturing the salient events, the apparatus 10 of an example embodiment may include means, such as the processor 12 or the like, for receiving a plurality of images captured by the image capturing device and means, such as the processor or the like, for determining whether an image of a salient video segment captured by the image capturing device includes the salient object. See blocks 50 and 52 of FIG. 5. This determination may be performed for each image of a salient video segment. Alternatively, the apparatus, such as the processor, may be configured to evaluate the relevancy of the salient orientation in accordance with a predefined time schedule, such as every five minutes, ten minutes or the like, or following the capture of a predetermined number of images, such as every 100 images, every 1,000 images or the like. In an instance in which the image of the salient video segment includes the salient object, the apparatus, such as the processor, determines that the salient orientation continues to remain relevant and continues capturing and analyzing images in the manner described above in conjunction with FIG. 2. See block 54 of FIG. 5.

However, in an instance in which the salient object is determined to not be in the image, the apparatus 10 may include means, such as the processor 12 or the like, for analyzing one or more images subsequently captured by the image capturing device 20 to identify the salient object. See block 56 of FIG. 5. In this instance, the apparatus may also include means, such as the processor or the like, for redefining the salient orientation to be the orientation of the image capturing device when the image that was subsequently captured and that includes the salient object was captured. See block 58 of FIG. 5. As such, the salient orientation may be redefined and may thereafter be utilized in the manner described above in conjunction with FIG. 2 in order to identify the images that may capture a salient event that are thereafter analyzed in the manner described above.

While the process described above in conjunction with FIG. 5 may analyze an individual image of a salient video segment to determine if the image includes a salient object and may make a determination regarding the continued relevancy of the salient orientation based upon the analysis of the single image, the apparatus 10, such as the processor 12, of other example embodiments may analyze a plurality of images of a salient video segment to determine if the images include the salient object. In this example embodiment, the apparatus, such as the processor, may determine that the salient orientation needs to be redefined in an instance in which the salient object does not appear in any of the images or in which the salient object appears in a percentage of the images that fails to satisfy, that is, falls below, a predefined threshold. Otherwise, the apparatus, such as the processor, may continue to utilize the same salient orientation even if only some, but not all, of the images of the salient video segment include the salient object.

In instance in which the salient orientation is to be redefined and one or more images that are subsequently captured by the image capturing device 20 are analyzed to identify the salient object, the apparatus 10, such as the processor 12, may be configured to consider the salient object to be successfully detected in the subsequent images in an instance in which the salient object is identified in a predefined number of temporally adjacent images with the position of the salient object in the temporally adjacent images also being consistent with the motion of the image capturing device. For example, in an instance in which the salient object is identified in more than ten temporally adjacent images and the position of the salient object does not change by more than a predefined extent in those images captured by the image capturing device that has not moved as indicated by the sensors 22, the apparatus, such as the processor, may determine that the salient object has been successfully detected and the orientation of the image capturing device while capturing the images that include the salient object may be identified to be the salient orientation for subsequent image capturing analysis. As another example, in an instance in which the salient object within the temporally adjacent frames moves toward the right and the apparatus, such as the processor, determines from an analysis of the sensor information provided by the image capturing device that the image capturing device has moved towards the left, the apparatus, such as the processor, may determine that the salient object has been successfully detected. However, if the position of the salient object within the images changes in an inconsistent manner relative to the motion of the image capturing device as defined by the sensor information, the apparatus, such as the processor, will not consider the salient object to have been successfully detected. As represented by the foregoing examples, the apparatus, such as the processor, may update the salient orientation, such as in an instance in which the image capturing device is moved during the video recording of the event, such that the images of the salient object are captured and the likelihood of identifying the salient events during the course of the event remains high.

A method, apparatus 10 and computer program product are therefore provided in accordance with example embodiments in order to identify one or more salient events from an analysis of one or more images in an efficient and accurate manner. In this regard, the method, apparatus and computer program product of an example embodiment may limit the visual analysis of the images to only a temporal region of interest and, more particularly, to a spatio-temporal region of interest that includes the subset of images that are determined to be potentially relevant based upon sensor information provided by one or more sensors carried by the image capturing device 20. As such, the method, apparatus and computer program product of an example embodiment may more efficiently identify salient events by reducing the computational resources required to visually analyze a smaller number of the images that are captured. Additionally, by limiting the visual analysis to one or more images that are determined to be potentially relevant based upon sensor information, the method, apparatus and computer program product of an example embodiment may reduce the likelihood of a false positive, thereby increasing the accuracy with which the salient events are identified.

As described above, FIGS. 2 and 5 illustrate flowcharts of an apparatus 10, method and computer program product according to example embodiments of the invention. It will be understood that each block of the flowcharts, and combinations of blocks in the flowcharts, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus employing an embodiment of the present invention and executed by a processor 12 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   determining an orientation of an image capturing device based upon sensor information provided by one or more sensors carried by the image capturing device and relating to an orientation of the image capturing device;
   identifying, with a processor, one or more images captured by the image capturing device to be a salient video segment based upon the sensor information relating to an orientation of the image capturing device, wherein the one or more images are identified to be the salient video segment based upon a relationship of the orientation of the image capturing device to a salient orientation; and
   identifying one or more salient events based upon an analysis of the one or more images of the salient video segment.

2. A method according to claim 1 further comprising:
   receiving an indication of the salient orientation.

3. A method according to claim 2 wherein receiving the indication of the salient orientation comprises receiving user input indicative of the salient orientation.

4. A method according to claim 1 wherein identifying one or more images to be the salient video segment comprises identifying one or more images to be the salient video segment based upon satisfaction of a predefined angular distance threshold between the salient orientation and the orientation of the image capturing device.

5. A method according to claim 1 further comprising analyzing the one or more images of the salient video segment to identify the one or more images that include a salient object, wherein the one or more images that include the salient object comprise a spatio-temporal region of interest, and wherein the method identifies one or more salient events based upon an analysis of the one or more images of the spatio-temporal region of interest.

6. A method according to claim 5 further comprising:
   receiving an indication of the salient object prior to defining the spatio-temporal region of interest;
      in an instance in which the processor is without a detection algorithm for the salient object, causing another computing device to be notified; and
   receiving the detection algorithm for the salient object from the another computing device.

7. A method according to claim 5 further comprising:
   following capture of a plurality of images by the image capturing device, determining whether an image of a salient video segment captured by the image capturing device includes the salient object; and
   in an instance in which the salient object is not in the image, analyzing one or more images subsequently captured by the image capturing device to identify the salient object and redefining the salient orientation as the orientation of the image capturing device when the image that includes the salient object was captured.

8. An apparatus comprising at least one processor and at least one memory including computer program code, the at least one memory and the computer program code configured to, with the processor, cause the apparatus to at least:
   determine an orientation of an image capturing device based upon sensor information provided by one or more sensors carried by the image capturing device and relating to an orientation of the image capturing device;
   identify one or more images captured by the image capturing device to be a salient video segment based upon the sensor information relating to an orientation of the image capturing device, wherein the one or more images are identified to be the salient video segment based upon a relationship of the orientation of the image capturing device to a salient orientation; and
   identify one or more salient events based upon an analysis of the one or more images of the salient video segment.

9. An apparatus according to claim 8 wherein the at least one memory and the computer program code are further configured to, with the processor, cause the apparatus to:
   receive an indication of the salient orientation.

10. An apparatus according to claim 9 wherein the at least one memory and the computer program code are configured to, with the processor, cause the apparatus to receive the indication of the salient orientation by receiving user input indicative of the salient orientation.

11. An apparatus according to claim 8 wherein the at least one memory and the computer program code are configured to, with the processor, cause the apparatus to identify one or more images to be the salient video segment by identifying one or more images to be the salient video segment based upon satisfaction of a predefined angular distance threshold between the salient orientation and the orientation of the image capturing device.

12. An apparatus according to claim 8 wherein the at least one memory and the computer program code are further configured to, with the processor, cause the apparatus to analyze the one or more images of the salient video segment to identify the one or more images that include a salient object, wherein the one or more images that include the salient object comprise a spatio-temporal region of interest, and wherein identifying one or more salient events is based upon an analysis of the one or more images of the spatio-temporal region of interest.

13. An apparatus according to claim 12 wherein the at least one memory and the computer program code are further configured to, with the processor, cause the apparatus to:
   receive an indication of the salient object prior to defining the spatio-temporal region of interest;
      in an instance in which the apparatus is without a detection algorithm for the salient object, cause another computing device to be notified; and
   receive the detection algorithm for the salient object from the another computing device.

14. An apparatus according to claim 12 wherein the at least one memory and the computer program code are further configured to, with the processor, cause the apparatus to:
   following capture of a plurality of images by the image capturing device, determine whether an image of a salient video segment captured by the image capturing device includes the salient object; and
   in an instance in which the salient object is not in the image, analyze one or more images subsequently captured by the image capturing device to identify the salient object and redefining the salient orientation as the orientation of the image capturing device when the image that includes the salient object was captured.

15. A computer program product comprising at least one non-transitory computer-readable storage medium having computer-executable program code portions stored therein, the computer-executable program code portions comprising program code instructions for:

determining an orientation of an image capturing device based upon sensor information provided by one or more sensors carried by the image capturing device and relating to an orientation of the image capturing device;

identifying one or more images captured by the image capturing device to be a salient video segment based upon the sensor information relating to an orientation of the image capturing device, wherein the one or more images are identified to be the salient video segment based upon a relationship of the orientation of the image capturing device to a salient orientation; and     identifying one or more salient events based upon an analysis of the one or more images of the salient video segment.

16. A computer program product according to claim 15 wherein the computer-executable program code portions further comprise program code instructions for:

receiving an indication of the salient orientation.

17. A computer program product according to claim 16 wherein the computer-executable program code portions further comprise program code instructions for analyzing the one or more images of the salient video segment to identify the one or more images that include a salient object, wherein the one or more images that include the salient object comprise a spatio-temporal region of interest, and wherein identifying one or more salient events is based upon an analysis of the one or more images of the spatio-temporal region of interest.

18. A computer program product according to claim 17 wherein the computer-executable program code portions further comprise program code instructions for:

following capture of a plurality of images by the image capturing device, determining whether an image of a salient video segment captured by the image capturing device includes the salient object; and     in an instance in which the salient object is not in the image, analyzing one or more images subsequently captured by the image capturing device to identify the salient object and redefining the salient orientation as the orientation of the image capturing device when the image that includes the salient object was captured.

19. A computer program product according to claim 15 wherein the program code instructions for identifying one or more images to be the salient video segment comprise program code instructions for identifying one or more images to be the salient video segment based upon satisfaction of a predefined angular distance threshold between the salient orientation and the orientation of the image capturing device.

20. An apparatus comprising:

means for determining an orientation of an image capturing device based upon sensor information provided by one or more sensors carried by the image capturing device and relating to an orientation of the image capturing device;

means for identifying one or more images captured by the image capturing device to be a salient video segment based upon the sensor information relating to an orientation of the image capturing device, wherein the one or more images are identified to be the salient video segment based upon a relationship of the orientation of the image capturing device to a salient orientation; and     means for identifying one or more salient events based upon an analysis of the one or more images of the salient video segment.

\* \* \* \* \*